ALEXANDER BOYNTON, INVENTOR,

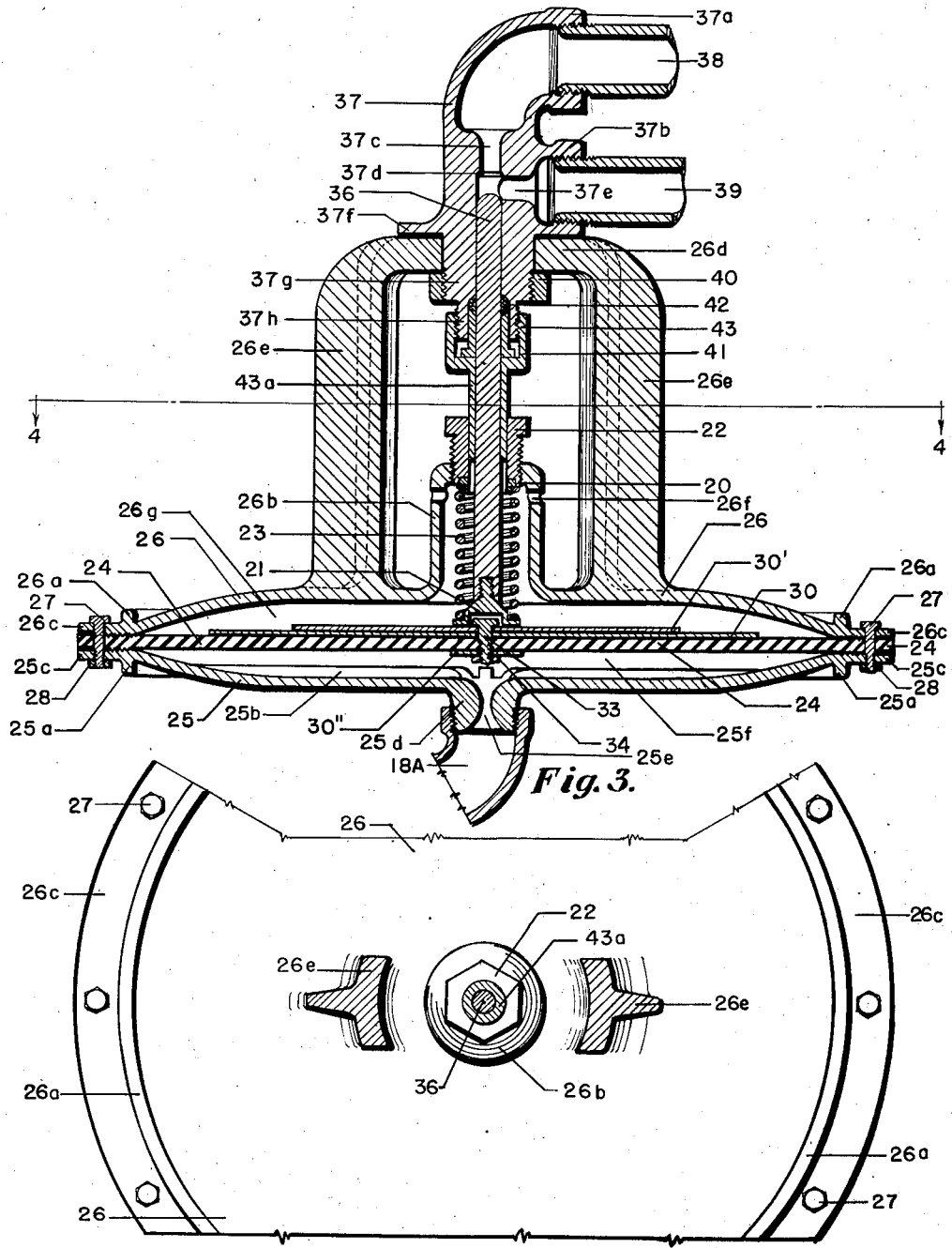

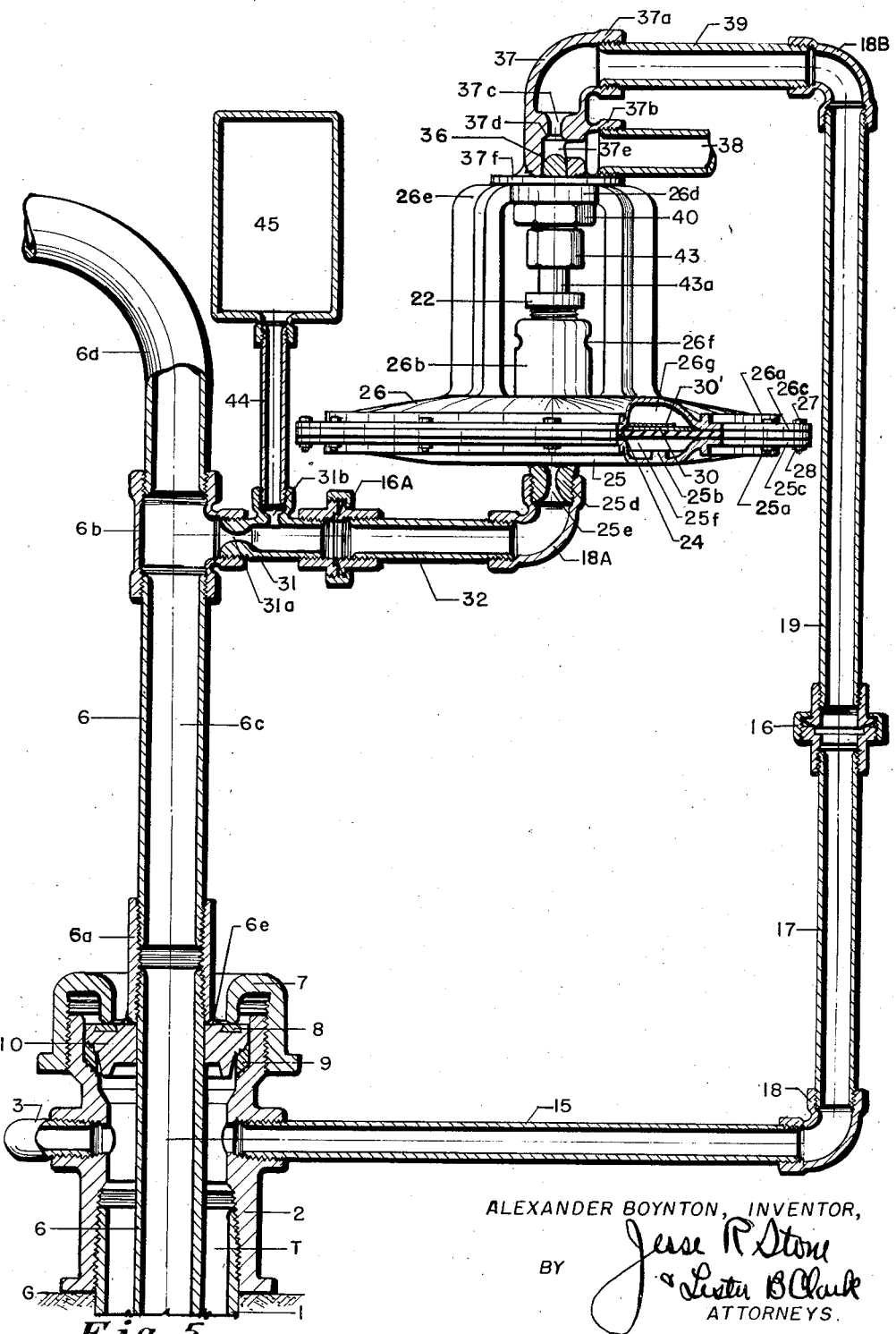

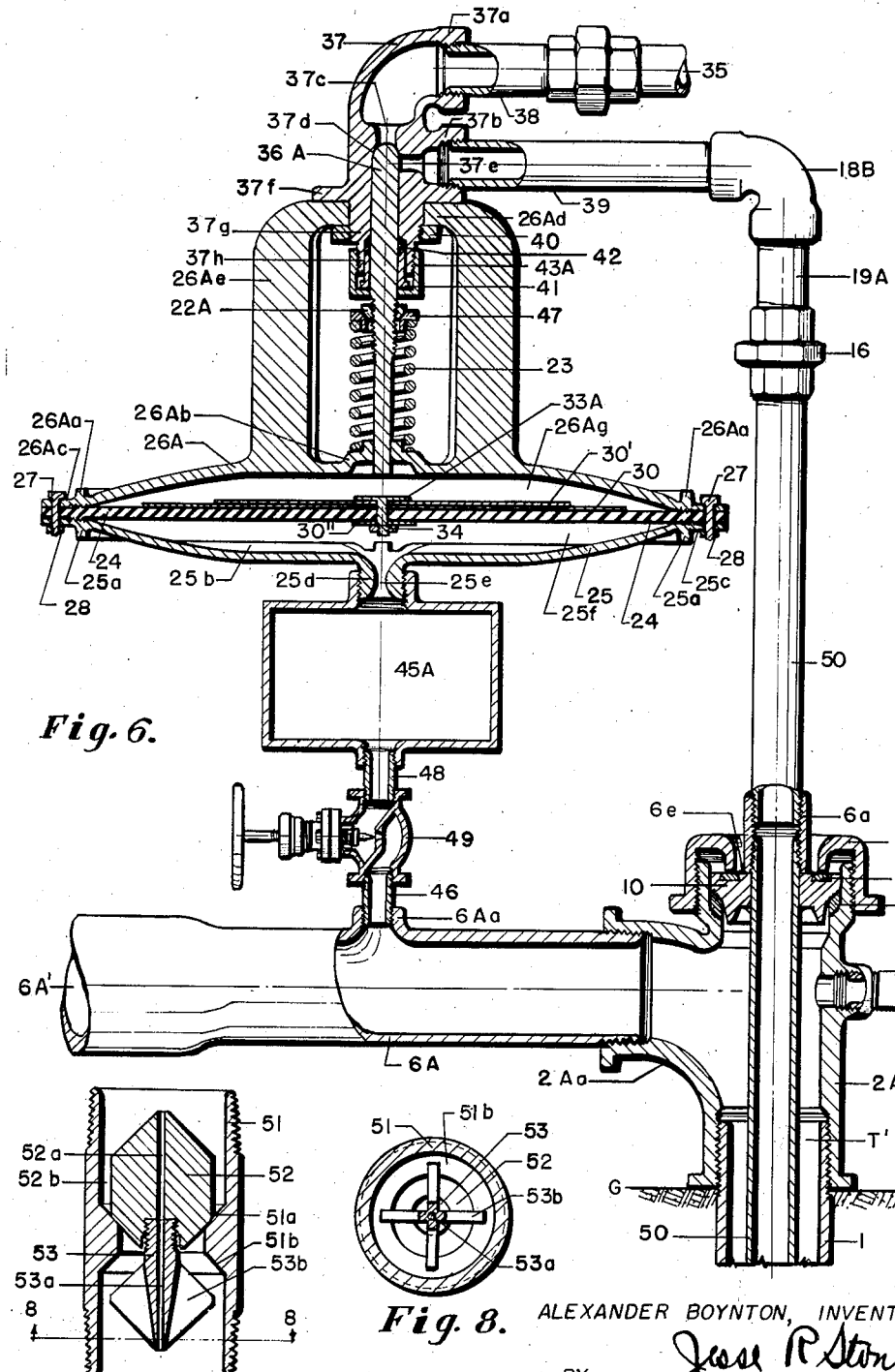
Sept. 29, 1942.  A. BOYNTON  2,296,833
INPUT AIR OR GAS CONTROL VALVE FOR CASED WELLS
Filed Jan. 31, 1939  4 Sheets—Sheet 4
ALEXANDER BOYNTON, INVENTOR,
BY Jesse R Stone
Lister B Clark
ATTORNEYS.

Patented Sept. 29, 1942

2,296,833

UNITED STATES PATENT OFFICE 2,296,833

INPUT AIR OR GAS CONTROL VALVE FOR CASED WELLS

Alexander Boynton, San Antonio, Tex.

Application January 31, 1939, Serial No. 253,879

3 Claims. (Cl. 103—16)

My invention relates to a means for controlling the flow of fluids by the action of a diaphragm and a valve. The valve closes by action of the fluid pressure of a predetermined value upon the diaphragm, the valve again opening when that pressure declines to a certain lesser value.

An object of this invention is to provide means whereby the input of air or gas into a well may be controlled or stopped for a time as soon as or soon after the well begins discharging its fluid through an eduction tube interior of the well casing, thereby to prevent the great waste of air or gas that ofttimes follows the slug of well liquid from wells that flow by heads.

A further object of this invention is to provide means for regulating the input of air or gas to a well so as to cause the well to flow through an eduction tube at a uniform rate and at proper intervals to make most economical use of the air or gas used to expel the liquid therefrom.

A further object is to provide a simple, durable, and dependable means for accomplishing the purposes stated by use of an eduction tube for well liquid installed either within a pressure tubing for receiving and containing the air or gas used to flow the well so that the air or gas pressure will not contact the producing formations, or by placing the air or gas within the well casing which may thus be used to replace the pressure tube by allowing the air or gas pressure to contact the producing formations of the well.

A still further object of this invention is to control the input of air or gas to an induction tube installed within a well casing to cause the well to flow through the casing, the input of air or gas to the induction tube being cut off at times by pressure from the flow stream in order to conserve lifting energy.

By reducing the gas-oil ratio in producing oil from wells by means of gas under pressure, it is a further purpose of this invention to prevent the unnecessary waste of natural gas.

In the first form of the invention, wherein a well is flowed through the tubing, I employ a valve adapted to cut off the admission of pressure fluid into the pressure tubing or into the annular space between the well casing and the flow tubing, by pressure from the flow tubing acting upon a diaphragm.

In another form of the invention, wherein a well is flowed through the casing, I employ similar means to cut off the supply of pressure fluid admitted into the well through an induction tube by means of pressure from the flow line acting upon a diaphragm.

In either construction, in the line that transmits pressure under the diaphragm, I install a reservoir and means for limiting the flow into the reservoir for the purpose of delaying the valve action, if necessary to do so, in order to obtain the best gas-oil ratio in flowing the well.

The invention, which is manifestly subject to many changes in construction and which may be used for many purposes other than controlling the flow of air or gas into wells and the flow of liquids therefrom, consists primarily in the particular construction and modifications which will more clearly appear from the drawings and specification which follows.

Fig. 3 is a longitudinal section of the invention.

Fig. 4 is a broken top view on the line 4—4, Fig. 3.

Fig. 5 is a view partly outside and partly in vertical section of the device shown in Fig. 3 as it may be installed upon a well to be flowed through an eduction tube without a pressure tube, the upper portion of the well being shown in vertical section.

Fig. 6 is a vertical section of a modified form of the invention shown in Fig. 3 as it may be installed upon a well to be flowed through the casing, the upper end of the well being also shown in vertical section with the piping shown by views partly outside and partly in section.

Fig. 7 is a vertical section of a two way check valve assembly which may be installed in place of nipple 46, Fig. 6.

Fig. 8 is a horizontal section on the line 8—8, Fig. 7.

Figures 1, 2:
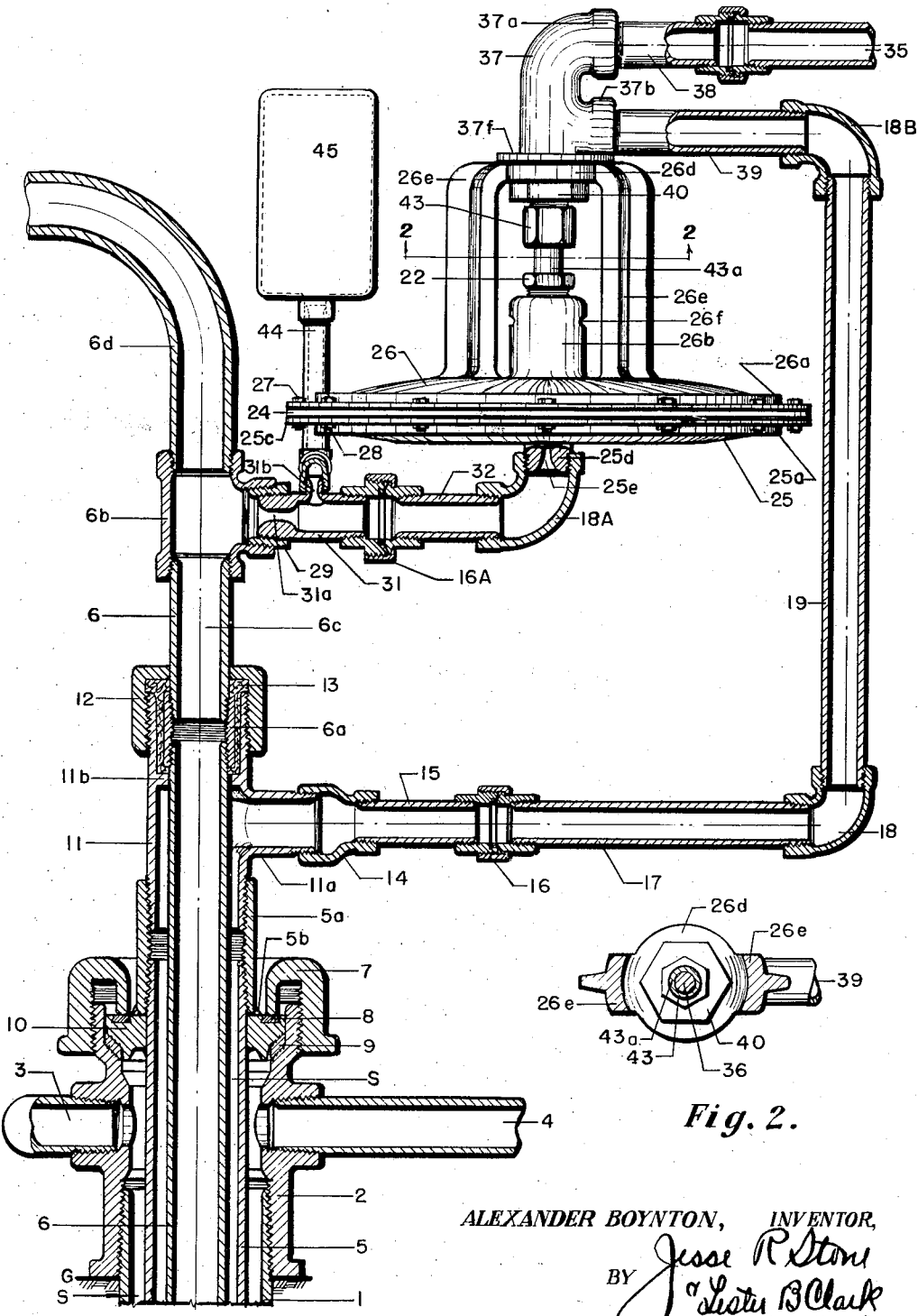
Fig. 1 is mostly an outside view of the invention, a boss being shown in vertical section, also the upper portion of a well in vertical section upon which it is installed, the well being flowed through an eduction tube within a pressure tube.
Fig. 2 is a horizontal section on the line 2—2, Fig. 1.

Similar but somewhat different parts in figures illustrating modifications of the invention are designated by adding capital A in the first modification and capital B in the second modification to the number used to designate the similar part in the preferred form. Different portions of the same part are referred to by adding a, b, c, and so on (small letters) to the number employed to designate the part as a whole. Duplicated portions of any part are designated by priming the last letter of reference for the first duplication, and double priming the last letter of reference for the second duplication.

The use of compressed air or gas to flow liquids from cased wells is rapidly increasing because greater volumes of liquid can be lifted by this means than by use of rods, valves, working barrels, and other so called standard pumps. Furthermore, the use of air or gas for such purposes simplifies the operation and greatly reduces the number of necessary parts.

In using air or gas to expel liquids from wells, particularly wells producing oil or oil and water, it has been the most common practice to install an eduction tube central of the well casing, a seal being had between eduction tube and casing at the top of the well casing and to insert compressed air or gas into the annular space between the eduction tube and the well casing for the purpose of forcing the well liquid out of the well through the eduction tube, generally called the flow tubing. This method permits the force of the compressed air or gas to be transmitted to the producing sands of the well, which force tends to hold back or retard the well liquid from entering the well. Another form of installation is to flow the well through the casing by forcing the compressed air or gas down the tubing, the path of well liquid flow in that case being upward through the annular space between the well casing and the tube central thereof. This type of installation likewise permits the air or gas pressure to contact the well sands.

In some cases the flow tubing is inserted in a pressure tube, a seal being made between these members proximate the bottom of the well as shown in my prior Patent 2,042,583, issued June 2, 1936. The seal between the pressure tubing 5 and the casing head 2 threadedly engaged with casing 1 may be made above ground surface G as shown by plate 10 forced down upon seal rings 8 and 9 by cap 7, coupling 5a being welded to plate 10 at 5b. The seal between the pressure tubing 5 and the flow tubing 6 may be made by coupling 6a resting upon internal flange 11b of T 11, packing 13 being forced downward by cap 12. Bull plug 3 closes one of the lateral openings in the casing head and pipe line 4 may be connected into the other opening to convey gas from the well. A bellows type of device installed with an eduction tube central of a pressure tube within a well casing, the upper portion of which members are shown in Fig. 1, is disclosed in my prior Patent 2,054,924, issued Sept. 22, 1936, and the present device is designed to be installed therewith, although it may be profitably installed to reduce the air- or gas-liquid ratios in any well from which liquid is expelled by use of input air or gas.

The different manners in which this invention may be installed are too numerous to describe them all but the installations shown in Figs. 1, 5, and 6 will be described to explain the device in principle, from an understanding of which many variations of these installations will be apparent.

The bellows type pneumatic piston pump above referred to is so made that the air or gas intake valve thereof closes when the pressure within the flow tubing drops to a predetermined value during or just after the expulsion of each slug of liquid from the well. This drop in pressure within the flow tubing must take place while the air or gas input into the annular space S continues to supply more air or gas to the flow tubing proximate its lower end, unless a means is provided for cutting off the flow of air or gas into the annular space S at times when such cutting off will conserve the air or gas and at the same time speed up the slugging cycle of the flowing operation.

After the slug of well liquid has reached the ground surface the expulsion of the slug will generally be accomplished by the continued expansion of the air or gas under the slug. Without a means of cutting off the air or gas supply into space S when the slug reaches the surface it is apparent that the uninterrupted flow of compressed air or gas from air or gas supply line 35 will not permit a rapid drop in pressure within the flow tubing (which has communication proximate its lower end with space S) thus allowing that an excessive amount of air or gas will follow the slug out of the well; but when used in conjunction with my bellows type pump, this means of cutting off the air or gas input into space S causes the pressure in space S and the flow tubing to quickly drop and the discharge of air or gas that follows the slug will be greatly reduced.

To quickly reduce the pressure in space S and the consequent discharge of air or gas from space S into the flow tubing 6 proximate its lower end at times when it is desired to quickly reduce the pressure within the flow tubing, this device is installed as shown in Fig. 1. Air or gas normally enters the space S via supply line 35 as appears in Fig. 1. This line of communication between air or gas supply line 35 and the annular space S is normally kept open by the action of coiled spring 23, installed under some compression, holding valve 36 open as shown in Fig. 3.

In observing the construction, which is simple, it will be noted that diaphragm 24, which may be made of rubber and fabric or any other strong, yieldable, and leak proof substance, is secured between base plate 25 and cover plate 26 by bolts 27 and nuts 28 clamping the periphery of the diaphragm between flanges 25c and 26c of the base and cover plates respectively. It can be seen in Fig. 3 that the inner surfaces of the flanges are finely grooved to securely engage the diaphragm, annular boss 25a integral with plate 25 and boss 26a integral with plate 26 provided to reinforce the flanges 25c and 26c respectively. Plates 25 and 26 may preferably be made of castings.

Integral with cover plate 26 two upstanding arms 26e are cast, circular plate 26d being integral therewith. Midway between the arms 26e upstanding central boss 26b is likewise integral with the plate 26. Depending extension 37g has a fit within the central opening through plate 26d within which it is secured by lock ring 40 causing flange 37f to engage tightly upon the upper surface of plate 26d. Packing 42 compressed by gland 41 urged by clamp 43 threadedly engaged upon extension 37h prevents the escape of compressed air or gas from the passages in which it is confined above valve 36 into the chamber 26g above the diaphragm. Openings 26f are provided that any air or gas which may so escape into the chamber 26g will go to atmosphere, thereby to constantly maintain atmospheric pressure within the chamber 26g.

Spring compression adjustment nut 22 which engages spring top shoe 20 has through it a central longitudinal opening within which tubular extension 43a of gland clamp 43 has a fit and is externally threaded to engage the internally threaded upper end of boss 26b for the purpose of adjusting the compression of spring 23 with which it engages. Metallic plates 30 and 30' positioned central of the diaphragm on its upper side are held in place by bolt 33 locked by nut 34 against washer 30".

Spring shoe 21 is formed to fit over the head of bolt 33 and rest upon plate 30', the upper end of this shoe having threaded engagement with valve 36, which has a working fit through clamp extension 43a, packing gland 41, and within the central opening through the lower portion of member 37 below the valve seat 37d with which the valve engages on its up stroke, as appears in Fig. 3.

The device may be installed by joining boss 37a to the air or gas supply line, and boss 37b to the tubular extension 11a by means of reducer 14, nipple 15, union 16, nipple 17, elbow 18, nipple 19, elbow 18B, and nipple 39, and by joining boss 25d to T 6b by means of bushing 29, nipple 31, union 16A, nipple 32, and elbow 18A. The device will, however, work equally well if these connections be reversed by connecting boss 37b to the air or gas supply line and boss 37a to the tubular extension 11a as will appear from an examination of Fig. 5 in which these connections are reversed.

It is not always necessary that a spring 23 be used to hold the valve 36 normally open, although that construction is preferred where the input air or gas is of such low pressure as would not force valve 36 away from seat 37d after the pressure under the diaphragm vanishes. In cases where the air or gas pressure above valve 36 is ample to open the valve again after the pressure under the diaphragm dissipates, the spring may be installed to normally urge valve 36 toward its seat 37d. Such construction provides that valve 36 will close at less pressure under the diaphragm than would be required to close the valve if the spring be installed as shown in Fig. 3. The spring installed so as to urge the valve upon its seat is shown in Fig. 6 and will be further explained under the discussion of that figure.

In operation, the device being installed as shown in Fig. 1, a slug of well liquid is assumed to be passing from the well through passage 6c of flow tubing 6, the slug having reached the flow line bend 6d. The pressure within the slug increases toward the base of the slug, that is the pressure exerted internal of the flow line bend 6d may be two ounces per sq. in. one foot below the top of the slug and the pressure 100 feet lower down in the same slug may be fifty pounds per sq. in., more or less, depending upon the velocity with which the slug is moving, the velocity in turn being determined by the pressure acting under the slug, the diameter of the flow line, length and number of bends in the flow line, as well as the viscosity and other physical properties of the liquid forming the slug. Therefore as soon as the top of the slug passes the opening 31a of nipple 31 well liquid (the slug usually somewhat gasefied or aerated) will enter the space 25f under the diaphragm 24 via bushing 29, nipple 31, union 16A, nipple 32, elbow 18A, and boss 25d. At the same time part of the slug will enter receiver 45 via fittings and nipples indicated generally at 44. If the opening 25e through boss 25d of base plate 25, and opening 31b through the upstanding boss of nipple 31 be of the same diameter the pressure will build up equally in space 25f under the diaphragm (Fig. 3) and within tank 45. The function of the tank 45 will be discussed after the valve action has been explained as follows: As the discharge of the slug continues the space 25f under the diaphragm will fill and pressure will build up under the diaphragm until valve 36 will engage upon its seat 37d thereby cutting off the air or gas flow into passage 37e leading into the well. The pressure under the diaphragm increases as the slug is discharged because the remaining portion of the slug in the flow tubing grows lighter as the upper portion is discharged; thereby to be expelled progressively faster.

The increasing velocity of the discharging slug adds friction which gives rise to a back pressure which is transmitted to the nether surface of the diaphragm. It is, therefore, apparent that the faster the slug is expelled the quicker the admission of air or gas into space S will be cut off where it is no longer needed to augment the supply of air or gas entering the flow tubing proximate the lower end thereof.

Receiver 45 is provided to slow down the closing of valve 36 if necessary to lengthen the period of air or gas flow into space S, depending upon well conditions. Deep wells require more air or gas to expel their slugs, likewise larger flow tubing will increase the volume of air or gas required to expel slugs from wells of equal depth. This added volume of air or gas is supplied by delaying the closing of valve 36 until more of the slug is expelled. This delay may be accomplished in two ways: first, by reducing the diameter of opening 31a so that the flow into space 25f under the diaphragm will be slower, or second, by providing receiver 45 within which pressure builds up through opening 31b the same as it builds up under the diaphragm. If the opening 31a be made too small it may become choked by solids in the well liquid. It is, therefore, better to provide tank 45 to increase the space within which pressure must be built up rather than to unduly decrease the size of opening 31a. If it is not desired to use receiver 45 a needle valve may be placed between bushing 29 and nipple 31 to reduce the size of the opening through the valve, corresponding in purpose to the restricted opening 31a.

If a receiver 45 is used the opening 25e should be the same size or slightly smaller than the opening 31b in order that it will be certain the pressure will build up in receiver 45 as fast as it builds up under the diaphragm.

Plates 30 and 30' are to cause the diaphragm to rise evenly over the entire area covered by plate 30 as pressure builds up in chamber 25f. Radial ribs, 25b, Fig. 3, provide that the diaphragm will never close the opening 25e and that pressure can always enter through this opening to contact the entire lower surface of the diaphragm.

The difference between the area of plate 30 and the cross sectional area of the valve 36 establishes the ratio between the two opposing forces, one force acting above the valve to keep it open, the other force acting under the diaphragm to close the valve. If, for example, the cross sectional area of the valve be ¼ sq. in. and the pressure in opening 37c be 300 lbs. per sq. in. the valve will resist closing by ¼ of 300 lbs. or 75 lbs. plus the force required to compress the spring far enough to allow the valve to seat. This spring force is assumed to be 30 lbs. If the area of plate 30 be 300 sq. in., .35 lb. pressure per sq. in. under it will exert a lifting force of 105 lbs. on the valve and equalize the opening force. Only slightly more than .35 lb. pressure per sq. in. under the diaphragm will, therefore, close the valve. The area of that portion of the free diaphragm beyond the outer edge of plate 30 also exerts a lifting force upon the valve but was not taken into account in the above example because that portion of the diaphragm in stretching absorbs part of the energy exerted under it. From the foregoing example it will be seen that very high air or gas pressures may be cut off from entering the space S by valve 36 and kept cut off as long as any appreciable flowing activity continues in the flow line.

After each slug has been expelled it is necessary that all gas or liquid within chamber 25f and receiver 45 be drained out in order that the device may be ready to act as heretofore described when the next slug appears in flow line bend 6d. Accordingly it may be observed that chamber 25f and receiver 45 drain by gravity back into T 6b from which the liquid draining back will be blown out of flow line 6d by the gas that follows each slug.

In Fig. 5 the pressure tubing 5 shown in Fig. 1 is omitted. The seal between the casing head and the flow tubing 6 is made by weld 6e in the same manner as a similar seal was made between the pressure tubing and the casing head in Fig. 1. The input air or gas line is connected to a casing head lateral opening by nipple 15 which discharges into the annular space T replacing the space S in Fig. 1 as a receptacle for input air or gas. All other parts being the same and operating the same as the corresponding parts in Fig. 1 (except the hook up to nipples 38 and 39 which are reversed) no further discussion is necessary to show how a slug of well liquid flowing through flow line bend 6d will cut off the air or gas supply into the annular space T as was explained in connection with the operation of the device shown in Fig. 1.

It will be noted that the nipples 38 and 39 have been reversed from the hook up shown in Fig. 1 connecting the input supply of air or gas to boss 37b and by connecting the discharge line to the well into boss 37a. The device operates the same with either hook up as previously stated and as is apparent.

In Fig. 6 a modified form of the invention shown in Figs. 1 and 3 is shown installed on a well flowing through the annular space T' within the casing by means of air or gas discharge below the surface of the well liquid through induction tube 50 the lower end of which is usually proximate the bottom of the well. The discharge line 6A threadedly connected to boss 2Aa of casing head 2A is preferably as large as the well casing, and should be larger toward the flow tank as shown at 6A' if the flow line intermediate the well and the flow tank is of any considerable length, this being good practice by whatever means the well is to be flowed.

Needle valve 49 may be opened wide to allow pressure to build up quickly within tank 45A by way of valve 49 and nipples 46 and 48, and in chamber 25f under the diaphragm, thereby to quickly cut off the supply of air or gas to tube 50 after the slug reaches nipple 46, or the valve may be partly opened in order to delay the closing of valve 36A. Valve 49 in Fig. 6 replaces the restricted passage 31a in Fig. 1 and receiver 45A corresponds in purpose to the receiver 45 in Figs. 1 and 5 as is apparent.

The valve 36A is normally held upon its seat 37d by spring 23 having its lower end engaged upon boss 26Ab of the cover plate 26A, this changed boss constituting the only difference between the cover plates in Figs. 1 and 6. The upper end of spring 23 is received by a shoe 47 having an internal bore somewhat larger than the outside diameter of the threaded exterior of the central portion of valve 36A upon which nut 22A engages for the purpose of adjusting the compression of the spring. The circular external bevel upon the lower end of nut 22A engages a corresponding internal bevel within the upper end of shoe 47 for the purpose of holding the shoe and spring central of the threads and aligned with the valve. Packing gland clamp 43A acting upon gland 41 compresses packing 42 for the purpose of preventing leakage of compressed air or gas from the passages above the valve.

The slight change in construction from that in Fig. 3 is to hold valve 36A normally closed upon seat 37d instead of open as shown in Fig. 3. The distance between the lower end of valve 36A and the head of bolt 33A, when the diaphragm is level as shown in Fig. 6, is such as will allow the valve to be opened wide by the pressure above it; and the total length of the valve is such that its lower end will contact the head of bolt 33A when the valve is closed by the upward distension of the diaphragm. To allow this, slight clearance is, of course, provided between plate 30' and the roof of chamber 26Ag when valve 36A is closed upon its seat 37d.

It will be seen that the flow line 6A' is very much larger than the flow lines employed in Figs. 1 and 5. The resistance offered within the line 6A' to the slug in passing will, therefore, be much less in this larger line than the resistance in flow line 6d of Figs. 1 and 5. The pressure exerted under the diaphragm in Fig. 6 will, therefore, be much less than that acting under the diaphragm in Figs. 1 and 5. For that reason a more sensitive valve action is necessary in Fig. 6 which shows a very sensitive valve as appears from the following example in which it is assumed that spring 23 urges valve 36A upon seat 37d by 75 lbs., that the cross sectional area of the valve is ¼ sq. in., and that 312 lbs. per sq. in. is constantly held in the supply line 35. The spring closing force of 75 lbs. urging the valve toward its seat is, therefore, overcome by 78 lbs. (¼ of 312). The valve is, therefore, open and held open by 3 lbs. The action area of the diaphragm is further assumed to be 300 sq. in. the same area as was assumed in the discussion of the device shown in Fig. 3. $\frac{1}{100}$ of a pound pressure per sq. in. acting under the diaphragm in Fig. 6 will, therefore, close the valve 36A, this being only $\frac{1}{35}$ of the force required to close the corresponding valve shown in Fig. 3 with the same assumed areas of valves and diaphragms in both constructions. The extreme sensitiveness of the valve 36A, therefore, becomes strikingly apparent. The difference was caused entirely by reversing the action of spring 23.

Nipple 19A, annular boss 26Aa, flange 26Ac, circular plate 26Ad, and upstanding arms 26Ae correspond in use and purpose to the similar parts heretofore referred to, bearing the same reference characters less the letter A.

If a particular well condition should require that valve 36A close instantly when the slug appears in flow line 6A, and that the valve 36A should remain closed for a longer time after the slug passes out of the flow line than can be provided for in the construction as shown in Fig. 6, then replace the nipple 46 having threaded engagement with boss 6Aa (Fig. 6) with the two-way check valve assembly shown in Figs. 7 and 8 in which the valve housing nipple 51 has a valve seat 51a upon which valve 52 normally engages. The clearance 52b is relatively large and the central passage 52a is relatively small. The winged stop 53 having a central passage 53a which registers with the passage 52a has threaded engagement within the lower end of valve 52. Wings 53b engage under the wing seat 51b when the valve is raised to its wide open position thereby to hold this valve central of the passage through nipple 51 and proximate the seat 51a. The cross sectional area of the clearance 52b is many times greater than the similar area of the passage 52a.

With the nipple and valve assembly shown in Figs. 7 and 8 installed in place of nipple 46 in Fig. 6, the slug of well liquid appearing in flow line 6A will quickly transmit pressure under the diaphragm 24 to close valve 36A (this valve being assumed to be previously open by the pressure in passage 37c as was explained for Fig. 6) but when the slug passes out of the flow line the pressure under the diaphragm will linger on account of the seating of valve 52 and the consequent closing of the passage 52b.

Pressure appears under the diaphragm 24 via both openings 52b and 52a—53a and disappears from there only through the small opening 52a—53a. The valve 52 will, therefore, quickly cut off the supply of input air or gas via induction tube 50 when the slug appears in flow line 6A and will keep this supply cut off for a considerable time after the slug has been completely discharged. This action of valve 52 delays the building up of pressure against the well sands after each slug is delivered and lengthens the interval between slugs, both of which results will often be found desirable in producing oil from wells under legal proration now generally in effect.

From the foregoing it is plain that the quantity of production and the interval between heads or flows from cased wells can both be controlled and regulated by this means of automatically synchronizing the relation between ingoing pressure fluid and outgoing well fluid. In many instances wells, especially old ones, will not discharge slugs at low air or gas pressure or at any other pressure that will not retard the inflow of well liquid. The wasteful practice of continuous flow is therefore often resorted to in order to avoid the use of high input pressures. This may be avoided by installing one form of my bellows type automatic stage lift devices at intervals in the flow tubing if the well is to be flowed through the tubing, and by installing another form of said devices at intervals in the induction tube if the well is to be flowed through the annular space between the induction tubing and the casing, both of said forms of automatic stage lift being disclosed in my copending application S. N. 242,772, filed November 28, 1938, patented Sept. 2, 1941, No. 2,254,207.

It is apparent that various changes may be made in the construction set forth in the specification and drawings, within the scope and purpose of this invention; and I reserve the right to make such changes in carrying out the objects thereof.

I claim:

1. In an input air or gas control means, a pressure tube within a well, an eduction tube in said pressure tube, said tubes having an annular space between them adapted to convey pressure fluid to the lower regions of a well, sealing means between said tubes proximate the mouth of the well, a conduit communicating with the interior of the pressure tube for introducing pressure fluid into said annular space, a valve seat in said conduit, a valve movable to engage said seat to interrupt the flow of pressure fluid through said conduit, a diaphragm operable to move said valve, a tubular connection into said education tube, said connection communicating with and adapted to supply pressure to the diaphragm to move the diaphragm and to close said valve by force of fluid entering said connection from the eduction tube, means for restricting the flow of fluid through said connection, a receiver in communication with said connection between said last mentioned means and the eduction tube, and means for restricting the rate of fluid flow between said receiver and said connection.

2. A well casing, an eduction tube therein forming an annular space within said casing, sealing means between said tube and casing proximate the upper end of said casing, a conduit for introducing pressure fluid into said annular space for the purpose of expelling well liquid through said eduction tube, a valve seat in said conduit, a valve movable to engage said seat to interrupt the flow of pressure fluid through said conduit, a diaphragm operable to move said valve, a tubular connection into said eduction tube, said connection communicating with and adapted to supply pressure fluid to the diaphragm to move the diaphragm and to close said valve by force of fluid entering said connection from the eduction tube, means for restricting the flow of fluid through said connection, a receiver in communication with said connection, and means for restricting the rate of fluid flow between said receiver and said connection.

3. Well flowing apparatus including a well bore having concentric pressure and eduction tubes therein, a conduit for introducing a pressure medium to the interior of the pressure tube, a valve in said conduit, a diaphragm operable to move said valve, a pressure connection between the eduction tube and said diaphragm, said connection including an orifice to control the flow of pressure medium to and from the diaphragm, and a reservoir communicating with said connection at a point between said orifice and the eduction tube to control the rate of change of pressure within the connection.

ALEXANDER BOYNTON.